L. L. KNOX.
VALVE AND FLUE ARRANGEMENT FOR REVERSING REGENERATIVE FURNACES.
APPLICATION FILED APR. 19, 1913.
1,087,124.
Patented Feb. 17, 1914.
6 SHEETS—SHEET 1.
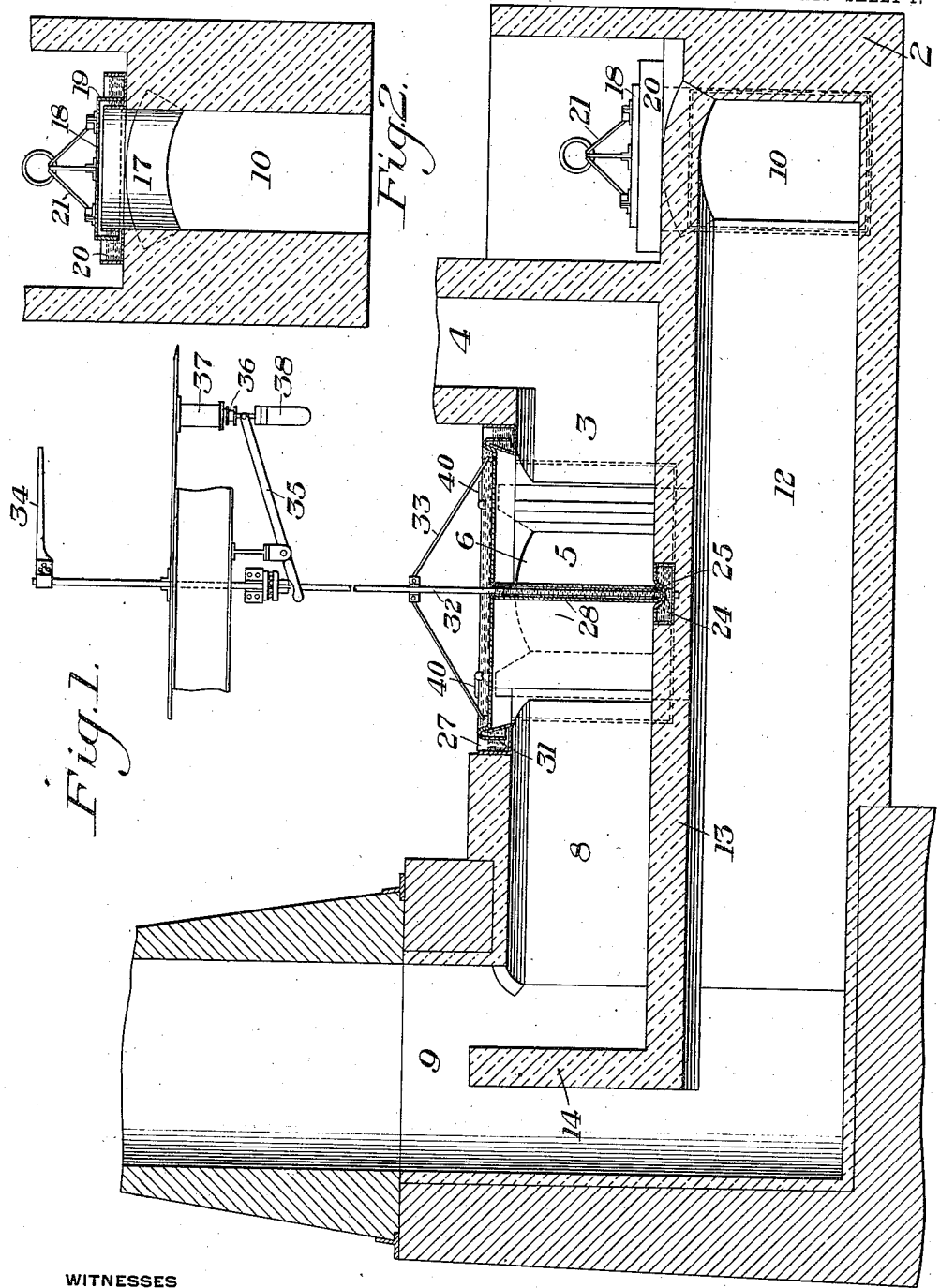
WITNESSES
INVENTOR

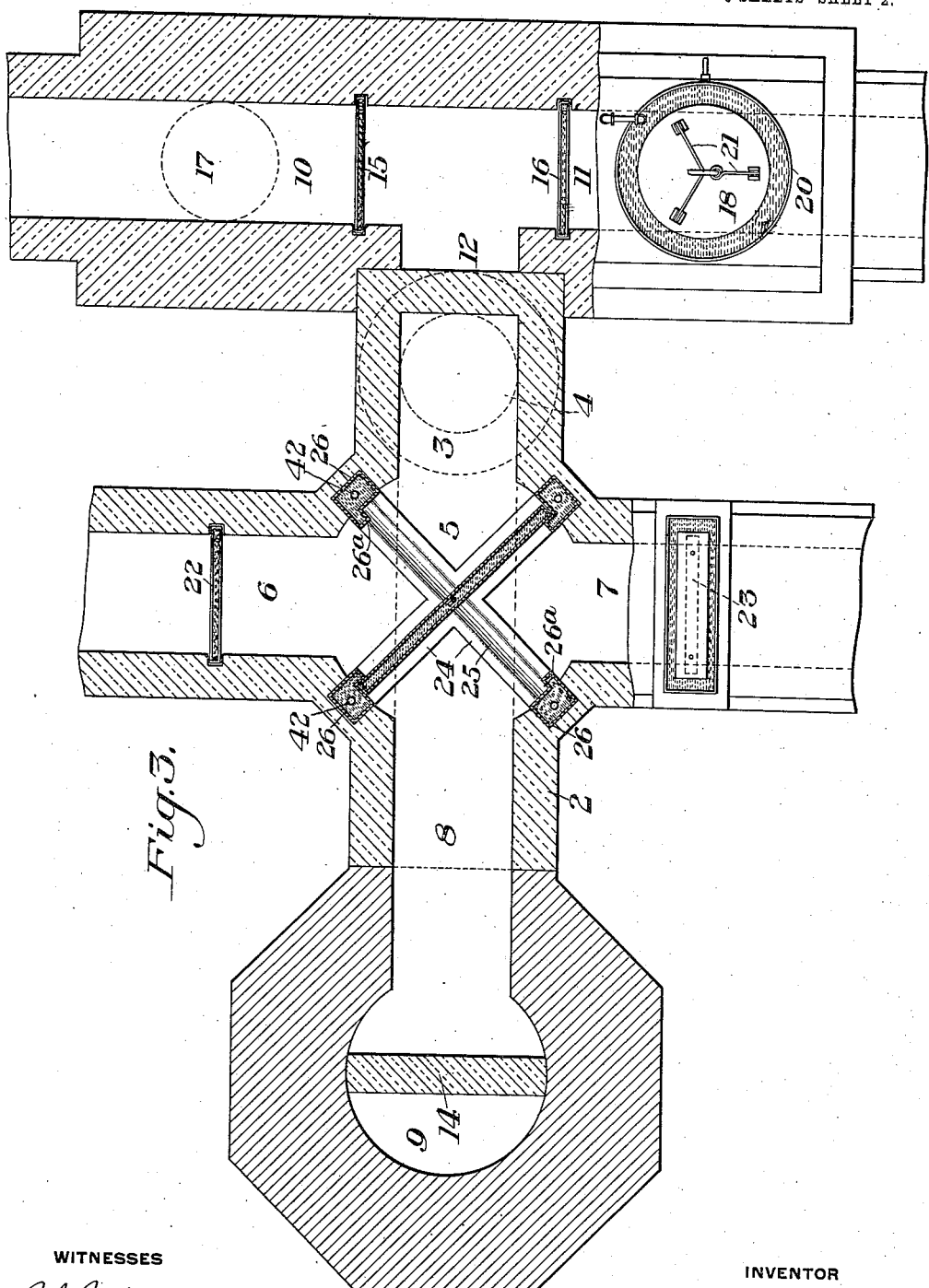

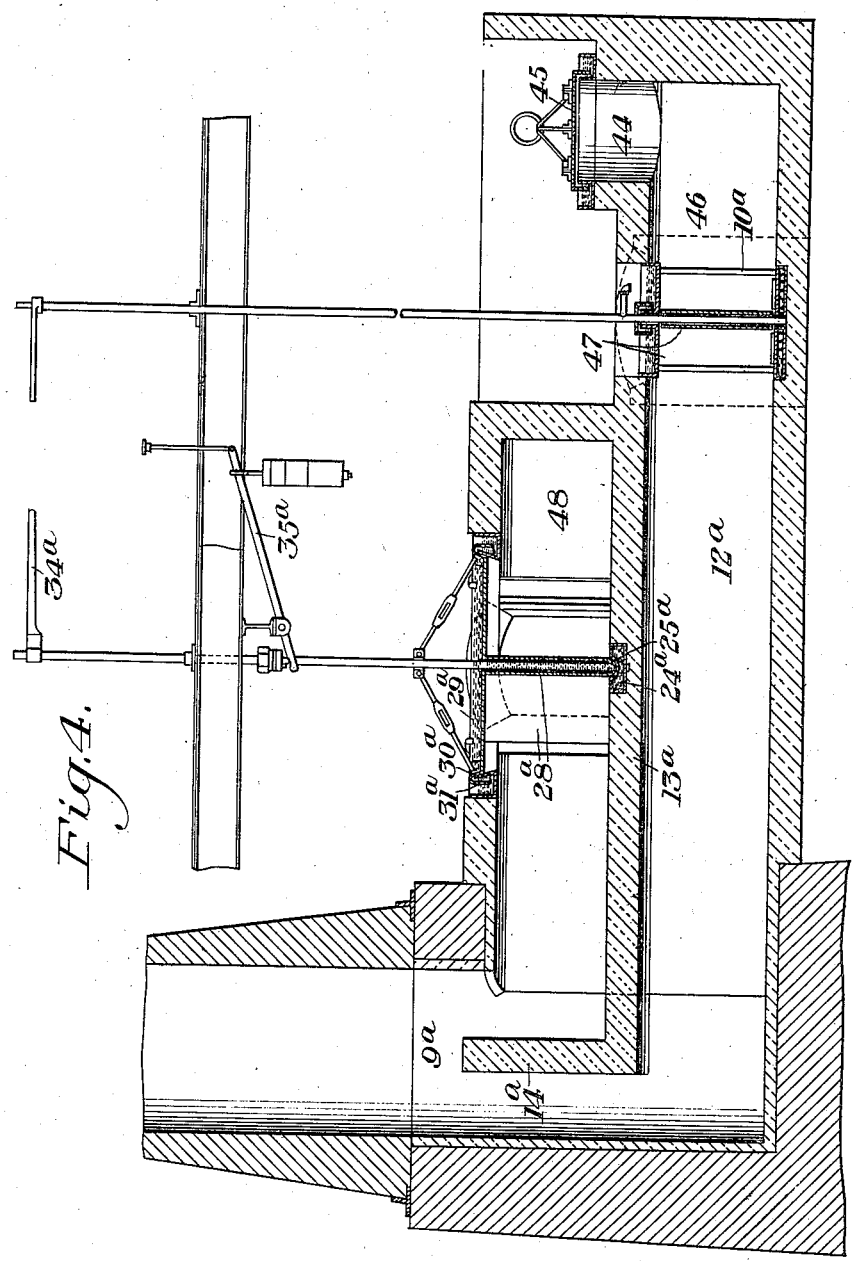

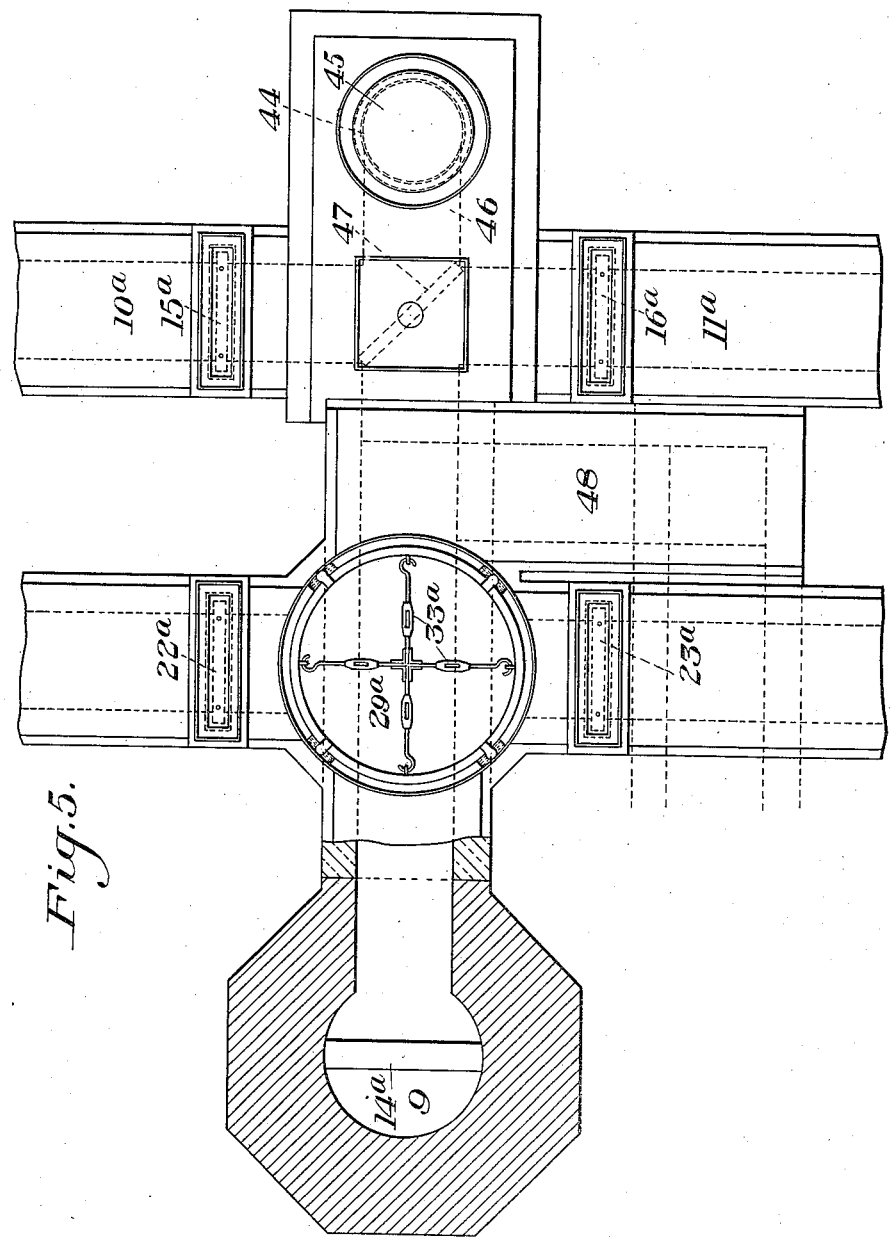

L. L. KNOX.
VALVE AND FLUE ARRANGEMENT FOR REVERSING REGENERATIVE FURNACES.
APPLICATION FILED APR. 19, 1913.
1,087,124.
Patented Feb. 17, 1914.
6 SHEETS—SHEET 5.
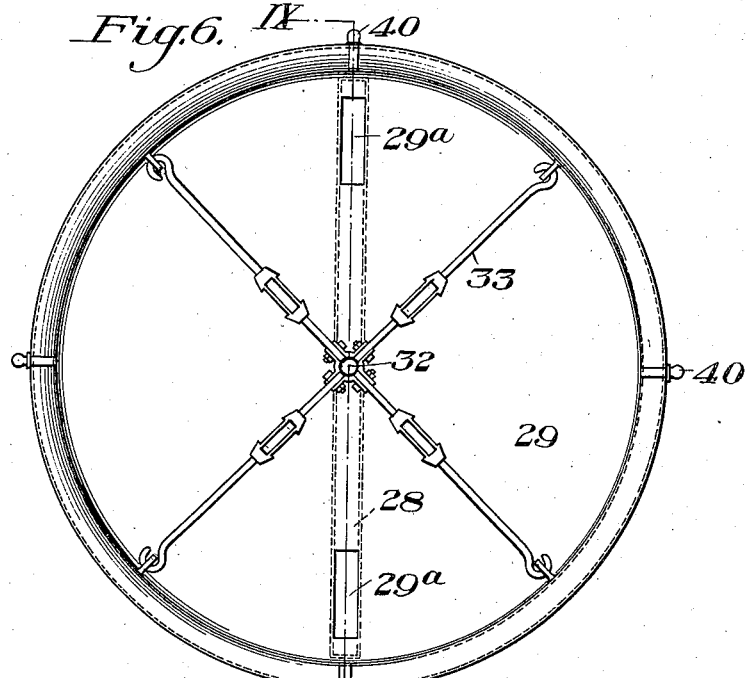
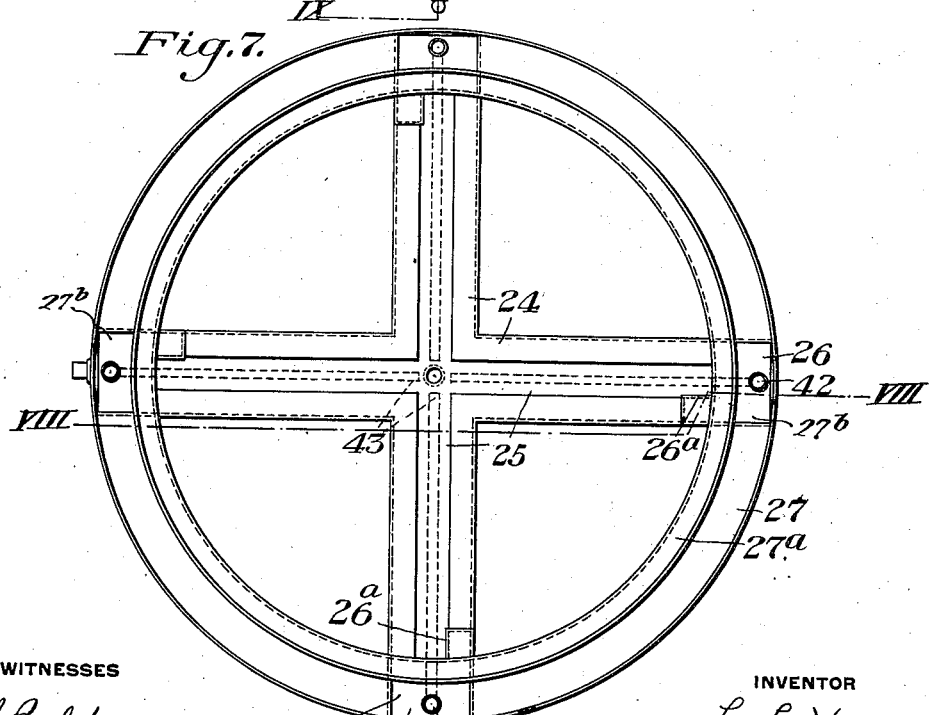

L. L. KNOX.
VALVE AND FLUE ARRANGEMENT FOR REVERSING REGENERATIVE FURNACES.
APPLICATION FILED APR. 19, 1913.
1,087,124. Patented Feb. 17, 1914.
6 SHEETS—SHEET 6.
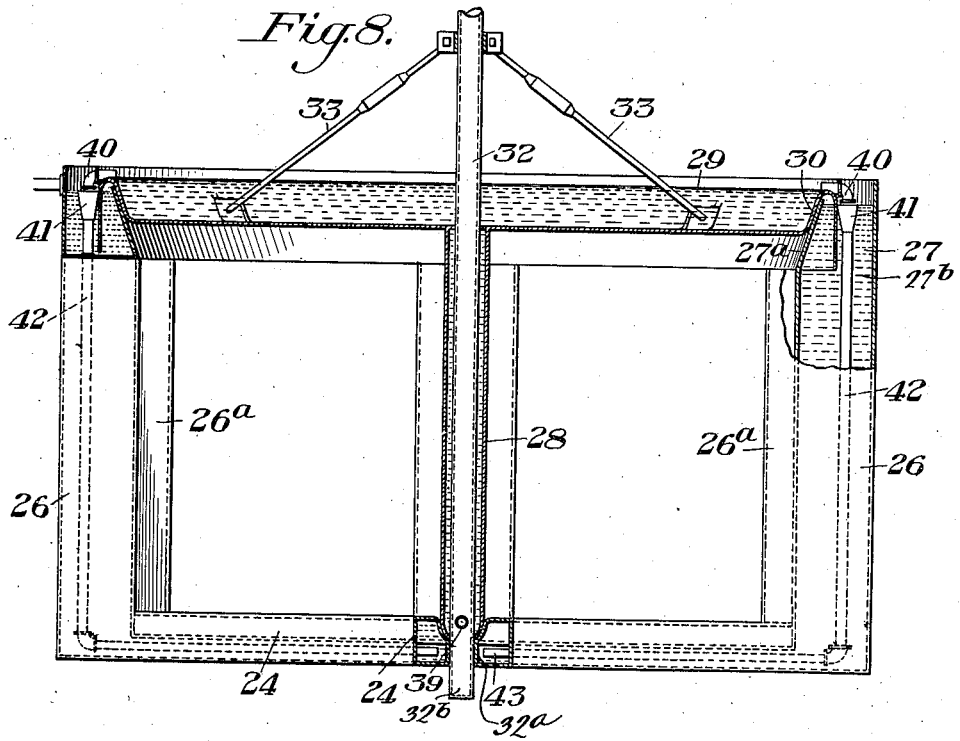
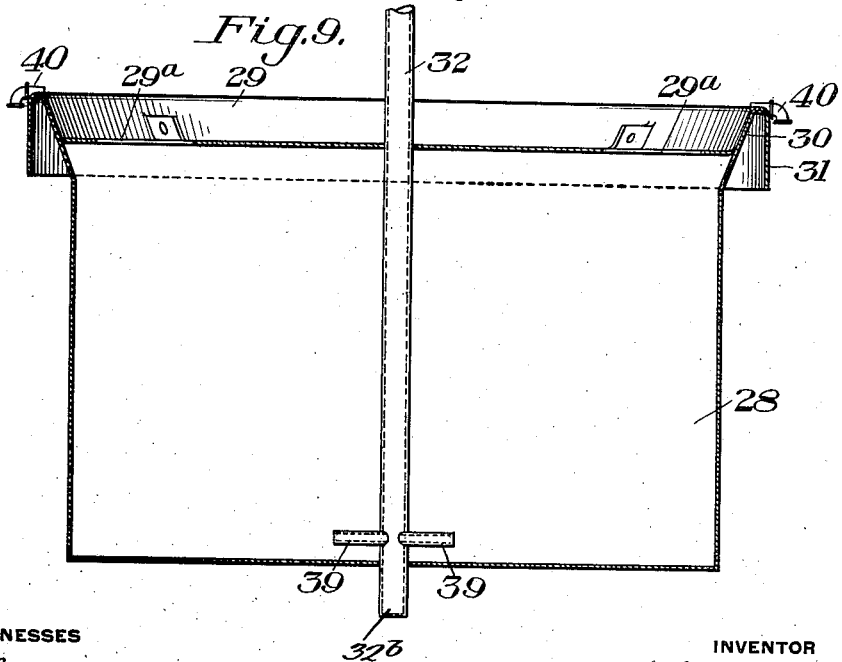
WITNESSES
INVENTOR

UNITED STATES PATENT OFFICE.

LUTHER L. KNOX, OF AVALON, PENNSYLVANIA, ASSIGNOR TO KNOX PRESSED & WELDED STEEL COMPANY, OF PITTSBURGH, PENNSYLVANIA, A CORPORATION OF PENNSYLVANIA.

VALVE AND FLUE ARRANGEMENT FOR REVERSING REGENERATIVE FURNACES.

1,087,124.

Specification of Letters Patent. Patented Feb. 17, 1914.

Application filed April 19, 1913. Serial No. 762,227.

*To all whom it may concern:*

Be it known that I, LUTHER L. KNOX, a citizen of the United States, and a resident of Avalon, in the county of Allegheny and State of Pennsylvania, have invented a new and useful Improvement in Valve and Flue Arrangement for Reversing Regenerative Furnaces. of which the following is a full, clear, and exact description, reference being had to the accompanying drawings, forming part of this specification, in which—

Figure 1 is a vertical section of one form of valve and flue arrangement embodying my invention; Fig. 2 is a vertical section showing one of the air inlet valves; Fig. 3 is a view partly in plan and partly in horizontal section of the arrangement shown in Fig. 1; Fig. 4 is a view similar to Fig. 1, but showing a modification; Fig. 5 is a view partly in plan and partly in horizontal section of the arrangement shown in Fig. 4; Fig. 6 is a top plan view of the reversing valve proper; Fig. 7 is a similar view of the valve-seating member; Fig. 8 is a section on the line VIII—VIII of Fig. 7, but with the valve in place; and Fig. 9 is a section on the line IX—IX of Fig. 6.

My invention has relation to a novel valve and flue arrangement for controlling the flow of air and gas to reversing regenerative furnaces.

One object of my invention is to provide a water-cooled gas-reversing valve of simple, novel and efficient character, in which the parts are thoroughly protected by the water-cooling, which is so arranged as to prevent the hot gases from coming into contact with the sealing water, which will form a perfect seal in both of its positions, and which can be readily and easily operated.

A further object of my invention is to provide a novel valve and flue arrangement in which the flow of gas in maintained at substantially the same level, up and down passes of the gas through the gas-reversing valve being obviated.

A still further object of the invention is to provide a flue and valve arrangement in which an air-reversing valve may be dispensed with and the flow of air can be controlled by the use of simple dampers.

Further objects and advantages of my invention will hereinafter appear.

The nature of my invention will be best understood by reference to the accompanying drawings, in which I have shown the preferred embodiments thereof and which will now be described, it being premised, however, that various changes may be made in the details of construction and arrangement of the various parts, without departing from the spirit and scope of my invention, as defined in the appended claims.

Referring first to the arrangement shown in Figs. 1 and 3, the numeral 2 designates the masonry work which forms the setting for the valve and in which the air and gas flues are formed.

3 designates the gas inlet flue having the inlet opening 4.

5 is the valve chamber for the gas-reversing valve, hereinafter described.

6 is one of the flues leading from the chamber 5 to the regenerators and thence to the furnace, and 7 is the other gas flue leading from the chamber 5 to the regenerators and to the opposite end of the furnace in the usual manner.

8 is a stack flue leading from the chamber 5 to the stack 9.

10 designates one of the air flues leading to the regenerators, and 11 the other air flue leading to the regenerators. These two flues communicate with a common flue 12, leading to the stack 9, this flue 12 being directly underneath the flues 3 and 8 and the chamber 5. The dividing wall 13, which forms the top of the flue 12 and the bottom of the flues 3 and 8 and of the chamber 5, is preferably extended upwardly a short distance within the stack 9, as shown at 14, in Fig. 1, so as to give a better draft through the respective flues. The communication between the air flue 10 and the stack flue 12 is controlled by a vertically movable damper 15, of suitable character, preferably water-cooled. A similar damper 16 controls the communication between the air flue 11 and the stack flue 12. The air flue 10 is provided with an air inlet 17 beyond the damper 15, and the air flue 12 has a similar inlet beyond the damper 16. Each of these inlets is controlled by lift valve 18, one of which is shown in Fig. 2. Although any suitable valve may be used, the valve which I have shown which I prefer to employ consists of a circular disk having a depending sealing flange 19 entering a water-sealing trough 20.

21 designates suitable lifting means for the valve.

The numeral 22 designates a vertically movable damper in the gas flue 6, adjacent to the chamber 5, and 23 designates a similar damper in the air flue 7. These dampers may be of any suitable character, preferably water-cooled.

I will now describe the gas-reversing valve, shown generally, in Figs. 1, 3, 4 and 5, and which, with its seating member, is shown in detail in Figs. 6, 7, 8 and 9. The seating member for this valve consists of a cruciform base 24, the arms of which are made hollow for the circulation of cooling water, and having in their upper surfaces the intersecting seating grooves 25 for the bottom of the valve. A hollow column 26 rises from the outer end of each arm of the base, these columns being set in the masonry 2 in the manner clearly shown in Fig. 3. The top portion of the seating member constitutes an annular trough 27, which rests upon the upper ends of the columns 26.

The valve consists of a flat diametrically extending apron portion 28, made hollow for the reception of cooling water and which is joined at its upper end to a circular open water pan 29, having the outwardly flared wall 30, from the upper end of which depends a vertical sealing flange 31. The inner wall 27ª of the trough 27 of the seating member is preferably flared upwardly and outwardly, as clearly shown in Fig. 8, so as to form a substantially close fit with the flared wall 30 of the pan 29. The valve is carried by a vertical shaft 32, extending downwardly within the portion 28 and having suitable lifting connections 33 with the pan 29. This shaft may be rotated in any suitable manner, as by means of the lever 34, shown in Fig. 1. The shaft is provided at its lower end with the extension 32ᵇ which has a bearing in a sleeve 32ª in the central portion of the bottom of the seating member or base 24 (see Fig. 8). It may also be moved vertically to raise and lower the valve out of and into the seating grooves 25 by any suitable means, such as the lifting lever 35, actuated by the piston 36 of a power cylinder 37. The piston rod 36 is preferably counterweighted as shown at 38.

Each vertical column 26 has at one of its inner corners a hollow offset 26ª, these offsets forming the seating surfaces for the edges of the valve in its closed positions, as clearly shown in Fig. 3. The valve moves through an angle of 90° from one closed position to the other. To move the valve, it is first raised out of the seating grooves 25 and is then turned. This preliminary raising movement of the valve serves to overcome the seals formed by carbon deposits from the gases, so that when raised, it can turn freely to its reverse position.

Any suitable means may be provided for circulating water through the valve and its seal. For this purpose, I have shown the shaft 32 as being hollow and designed to be connected with any suitable source of water supply, not shown. Within the lower portion of the valve apron 28 the shaft 32 has the water discharge arms 39. The entering cold water is thus discharged at the lower portion of the apron 28. As it becomes heated, it rises and passes into the water pan 29, through openings 29ª, formed in the bottom of the pan. The pan is provided with four overflow spouts 40, which are so positioned that each of them will discharge into the funnel-shaped upper end 41 of a vertical pipe 42, said funnel-shaped ends being located within the sealing trough 27. One of the pipes 42 extends downwardly within each hollow column 26, and is thence carried horizontally through one of the hollow arms of the cruciform base, discharging at 43 at the central portion thereof. The water so discharged rises through the columns 26 and through the open upper ends 27ᵇ of the columns and into the trough. In this manner, the cold water introduced into the valve apron first flows upwardly within the apron, thence into the water pan 29, thence through the overflow spout 40, and down through the pipes 42 into the base of the seating member. It then rises through the hollow columns of the seating member into the sealing trough at the top thereof.

With the valve in the position shown in Fig. 3, the gas enters the port 3, and thence flows into the gas flue 6. The flow through said port is controlled by the damper 22. The returning hot gases from the furnace come into the valve chamber 5 through the port 7, and thence passes through the flue 8 to the stack 9. Inasmuch as the flue 3, chamber 5 and flues 6, 7 and 8 are all at the same level, it will be seen that the gas has a straight sweep through the valve chamber and past the valve, instead of being compelled to take an up and down pass, as is customary in reversing valves, as heretofore generally used.

If the air inlet valve controlling the air inlet port 17 is open and the other air inlet valve 18 is closed, the air passes into the port 10 and returns through the port 11, thence to the flue 12 and the stack, the flow being controlled by the dampers 15 and 16. This arrangement of air inlet flues and dampers obviates the necessity for an air-reversing valve.

It will be noted that the gases passing through the gas-reversing valve chamber are entirely prevented from coming into contact with the water in the trough 27 which seals the valve, owing to the guard formed by the beveled walls 27ª and 30. All parts of the valve and its seat are thoroughly protected by the cooling water and an efficient seal is formed in both positions of the valve, not only at its edges, but also across its entire bottom which is resting within the grooves 25. The top of the valve is also efficiently protected by the water in the pan 29.

The arrangement shown in Figs. 4 and 5 is generally similar to that shown in Figs. 1 and 3, and corresponding parts have the same reference characters as in Figs. 1 and 3, but with the letter "a" applied thereto. The arrangement differs from that shown in Figs. 1 and 3 mainly in that a single air inlet 44 is employed, controlled by valve 45, which is shown as similar to one of the valves 18. This inlet communicates with a flue 46, from which the air flues 10ª and 11ª lead, an air-reversing valve 47 being located at the junction of the flues 46, 10ª and 11ª. The gas inlet port 48 is also shown as entering the gas-reversing air chamber in a slightly different manner from that shown in Figs. 1 and 3.

The advantages of my invention are many, some of them having been heretofore pointed out. The flue construction is greatly simplified, and in the preferred form, the air-reversing valve is done away with. The valve construction and arrangement is a very simple and practical one, and gives great durability and efficiency. By throwing the gas-reversing valve to a middle position, the gas may be allowed to sweep directly past the valve into the stack, for the purpose of blowing out the valve chamber, etc.

I claim:

1. In valve apparatus for reversing regenerative furnaces, a seating member comprising a cruciform base having valve-seating grooves therein, columns rising from said base, an annular water trough supported by said columns, and a vertically movable oscillating valve arranged to seat in the grooves of the base, said valve having a circular top provided with a depending flange extending into the water trough to form a water seal, substantially as described.

2. In valve apparatus for reversing regenerative furnaces, a seating member comprising a cruciform base having valve-seating grooves therein, columns rising from said base, an annular water trough supported by said columns, and a vertically movable oscillating valve arranged to seat in the grooves of the base, said valve having a circular top provided with a depending flange extending into the water trough to form a water seal, said flange and the inner wall of the water trough fitting each other to form a guard to prevent the gases passing through the valve chamber from coming into contact with the water from said trough, substantially as described.

3. In valve apparatus for reversing regenerative furnaces, a seating member comprising a cruciform base having valve-seating grooves therein, columns rising from said base, an annular water trough supported by said columns, and a vertically movable oscillating valve arranged to seat in the grooves of the base, said valve having a circular top provided with a depending flange extending into the water trough to form a water seal, and the circular top of the valve forming a water pan, substantially as described.

4. In valve apparatus for reversing regenerative furnaces, a seating member comprising a cruciform base having valve-seating grooves therein, columns rising from said base, an annular water trough supported by said columns, and a vertically movable oscillating valve arranged to seat in the grooves of the base, said valve having a circular top provided with a depending flange extending into the water trough to form a water seal, together with means for circulating water through the base and columns of the seating member and also through the valve, substantially as described.

5. In valve apparatus for reversing regenerative furnaces, a seating member having a cruciform base, the arms of which are hollow, a hollow vertical post rising from each arm, an annular water trough supported on the upper end of the columns and communicating therewith, a valve member comprising a vertical apron portion and a circular top portion having a depending flange adapted to enter said trough, and means for circulating cooling water successively through the valve and then through the seating member and into the said trough, substantially as described.

6. In valve mechanism for reversing regenerative furnaces, a seating member comprising a hollow cruciform base, a hollow vertical column rising from each arm of the base, an annular trough supported on the upper ends of the columns and communicating with them, a valve comprising a flat apron portion and a circular top portion with a depending sealing flange arranged to extend into said trough, a hollow actuating shaft for the valve, said shaft extending within the valve and acting as a water supply for discharging water into the lower part of the valve, the valve having a water pan at its top communicating with the interior of the valve proper and said pan having overflow openings communicating with water passages leading into said hollow columns, substantially as described.

7. In valve apparatus of the character described, a seating member having a hollow base, hollow columns, and an annular sealing trough supported on said columns, said parts having communicating water-circulating passages, a valve comprising a hollow apron portion, a water pan at the upper end of the apron portion and in sealing relation to the trough of the seating member, the seating member having a plurality of open and water-circulating pipes extending downwardly through the columns and into the base thereof, and the valve having overflows arranged to discharge into the upper ends of said pipes, substantially as described.

8. A valve and flue arrangement for reversing regenerative furnaces, comprising a setting having a gas-reversing valve chamber, a gas-reversing valve therein, regenerator ports leading horizontally outward from opposite sides of said chamber, a gas supply port leading horizontally into a third side of the chamber, a stack port leading horizontally outward from the side opposite the gas inlet port, said ports and chamber being all at substantially the same horizontal level, the setting also having air flues leading in opposite directions to the regenerators, and each of said flues having a separate air inlet, a stack flue with which both air flues communicate, and a damper in each of the air flues between its air inlet and the point where it communicates with the stack flue; substantially as described.

9. A valve and flue arrangement for reversing regenerative furnaces, comprising a setting having a gas-reversing valve chamber, a gas-reversing valve therein, regenerator ports leading horizontally outwardly from opposite sides of said chamber, a gas supply port leading horizontally into a third side of the chamber, a stack port leading horizontally outwardly from the side opposite the gas supply port, said ports and chamber being all at the same horizontal level and a regulating damper in each of the regenerator flues, the setting also having a stack flue extending below said valve chamber, and the regenerator ports communicating with said stack flue, an air inlet in each of said ports, and a damper between each air inlet and the point where the corresponding port communicates with the stack flue, substantially as described.

10. A valve and flue arrangement for reversing regenerative furnaces, comprising a setting having a gas-reversing valve chamber, a gas-reversing valve therein, said valve being arranged for both vertical and oscillating movement, regenerator ports leading horizontally outwardly from opposite sides of said chamber, a gas supply port leading horizontally into a third side of the chamber, and a stack port leading horizontally outwardly from the side opposite the gas supply port, said ports and chamber being all at the same level, and the valve being arranged to pass the gas from the inlet flue into either regenerator flue and from either regenerator flue into the stack flue without changing the level thereof, substantially as described.

11. In valve apparatus for reversing regenerative furnaces, a valve chamber having a plurality of flues communicating therewith, a seating member at the bottom of said chamber comprising a hollow cruciform base having valve-seating grooves therein, a valve member mounted for partial rotation about a vertical axis and arranged to be also moved vertically into and out of said grooves, said valve having a top portion forming a complete cover for the chamber when the valve is seated, and said cover having a depending flange, and a water trough around the top of said chamber and into which said flange depends, substantially as described.

12. A valve and flue arrangement for reversing regenerative furnaces, comprising a setting having a gas-reversing valve chamber, a gas-reversing valve therein, regenerative ports leading outwardly from opposite sides of said chamber, a gas inlet port leading into a third side of the chamber, and a stack port leading outwardly from the side opposite the gas inlet port, said ports and chamber being all at the same level, the setting also having two air flues leading to the regenerators, a valved air inlet for each flue, a stack flue communicating with both the air flues and extending underneath said chamber, and a controlling damper between each air inlet and the stack flue, substantially as described.

13. Valve apparatus of the character described, comprising a hollow cruciform base, a hollow column rising from each arm of the base, an annular water trough supported on the upper ends of the columns and communicating therewith, each column having at one corner a hollow inwardly projecting valve-seating offset, and a vertically movable and oscillating valve arranged to seat in two positions in said base and to seat and seal at its edges against said offsets, substantially as described.

14. Valve apparatus of the character described, comprising a valve chamber having a gas supply port leading horizontally into one side of said chamber, a stack port leading horizontally at the opposite side of said chamber, regenerator ports leading horizontally outward from the other two sides of said chamber, a gas reversing valve seated in said chamber to be oscillated about a vertical axis, a cruciform base at the bottom of said chamber having valve-seating grooves therein, an annular water trough supported at the top of the chamber, and said valve having a circular top provided with a depending flange extending into said trough to form a seal; substantially as described.

15. Valve apparatus of the character described, comprising a valve chamber having a gas supply port leading horizontally into one side of said chamber, a stack port leading horizontally at the opposite side of said chamber, regenerator ports leading horizontally outward from the other two sides of said chamber, a gas reversing valve seated in said chamber to be oscillated about a vertical axis, a cruciform base at the bottom of said chamber having valve-seating grooves therein, an annular water trough supported at the top of the chamber, and said valve having a circular top provided with a depending flange extending into said trough to form a seal, said trough having an upwardly and outwardly inclined inner wall, and the circular top of the valve having a flaring inset portion arranged to fit said inner wall; substantially as described.

16. Valve apparatus for reversing regenerative furnaces, a seating member comprising a cruciform base having valve-seating grooves therein, hollow columns rising from the arms of said base, an annular trough at the upper ends of said columns, and a vertically movable oscillating valve arranged to seat in the grooves of the base, said valve having a circular top provided with a depending flange which seats within said trough, said trough, the columns and the cruciform base having communicating water-circulating spaces; substantially as described.

17. In valve apparatus for reversing regenerative furnaces, a seating member comprising a cruciform base having valve-seating grooves therein, columns rising from said base, an annular water trough supported by said columns, and a vertically movable oscillating valve arranged to seat in the grooves of the base, said valve having a circular top provided with a depending flange extending into the water trough to form a water seal; said trough having an outwardly flared inner wall, and the top having an inset flared portion to fit said wall; substantially as described.

In testimony whereof, I have hereunto set my hand.

LUTHER L. KNOX.

Witnesses:
H. M. CORWIN,
GEO. H. PARMELEE.